P. F. STEIN.
APPARATUS FOR PRODUCING ARTIFICIAL ICE.
APPLICATION FILED APR. 6, 1908.
984,168. Patented Feb. 14, 1911.
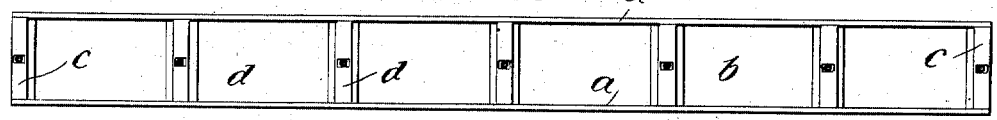
FIG. 1.
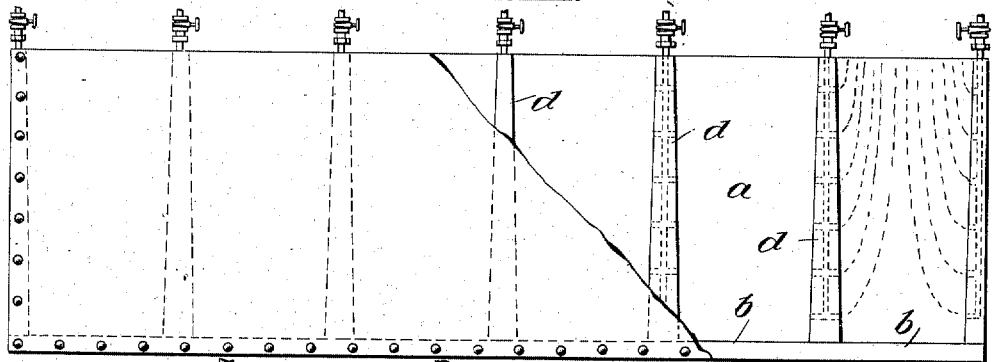
FIG. 2.
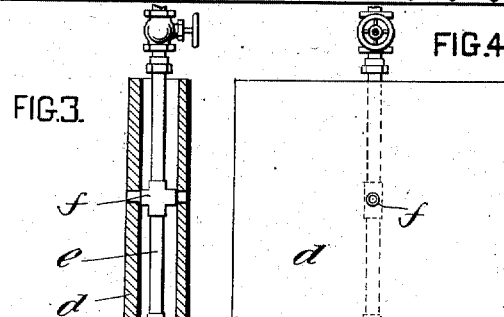
FIG. 4.
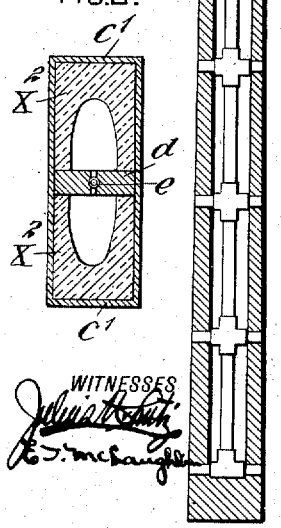
FIG. 3.
FIG. 6.
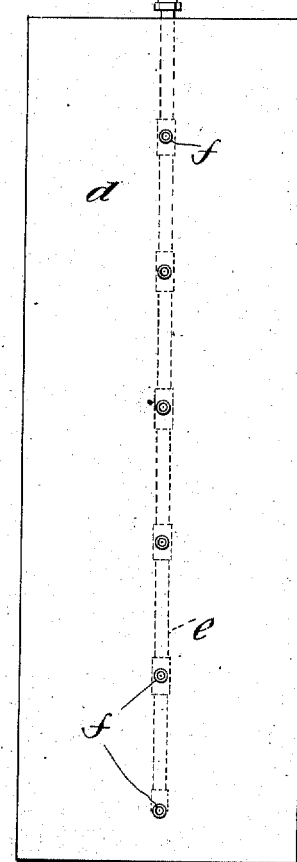
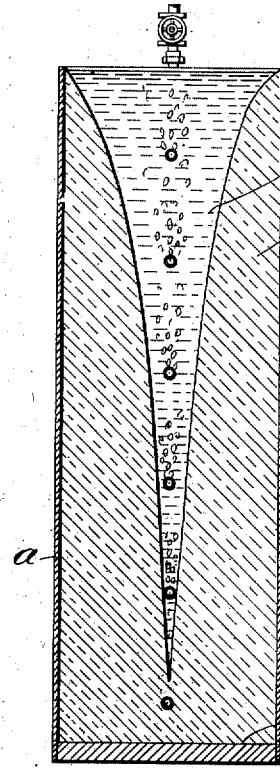
FIG. 5.
WITNESSES
INVENTOR
Paul F. Stein
BY
Isaac B. Owens.
ATTORNEY

UNITED STATES PATENT OFFICE.

PAUL F. STEIN, OF NEW YORK, N. Y.

APPARATUS FOR PRODUCING ARTIFICIAL ICE.

984,168.      Specification of Letters Patent.      Patented Feb. 14, 1911.

Application filed April 6, 1908. Serial No. 425,572.

*To all whom it may concern:*

Be it known that I, PAUL F. STEIN, of the city of New York, borough of Brooklyn, county of Kings, and State of New York, have invented certain new and useful Improvements in Apparatus for Producing Artificial Ice, of which the following is a full, clear, and exact specification, such as will enable others skilled in the art to which it appertains to make and use the same.

My invention relates to apparatus for producing artificial ice wherein the water to be frozen is placed in a receptacle and the same surrounded by the freezing influence and the object of my invention is primarily to produce such ice economically of uniform texture and without the snow-like improperly frozen central portion commonly present in ice of this character. I attain this end in a manner which will be fully set forth hereinafter and particularly pointed out in the claims.

Reference is had to the accompanying drawings showing one of the possible ways in which the invention may be practiced in which drawings, Figure 1 is a plan view of one form of the receptacle in which the ice is frozen; Fig. 2 is a side elevation thereof with parts broken away; Fig. 3 is a vertical transverse section of one of the non conducting partitions; Fig. 4 is an elevation of the same; Fig. 5 is a transverse section of the receptacle indicating the manner in which the ice is frozen; and Fig. 6 is a plan view of a modification.

The receptacle shown in Figs. 1 to 5 has metal or other heat conducting sides $a$. The bottom $b$ may be of conducting or non-conducting material but it is here shown of wood which is non-conducting. The ends of the receptacle $c$ are wood or other non-conducting material and when the receptacle is made to freeze more than one cake of ice as in the instance shown in the drawings, it is provided with a number of transverse partitions $d$ also of non-conducting material. Between the opposing heat conducting walls $a$ of the receptacle there is a free open space so that the ice may freeze across and completely fill the same without obstruction, forming a solid cake extending continuously from one wall $a$ to the other and from one partition $d$ to the other to the end wall $c$.

Fig. 5 illustrates the freezing process in which view X indicates the ice in the form which it assumes at some period intermediate the beginning and end of the freezing process. The freezing influence is not transmitted through the non-conducting walls $c$ and $d$ and hence there is no freezing longitudinally of the receptacle. The freezing influence is, however, transmitted through the conducting walls $a$ and hence at the inception of the freezing process ice forms in a thin sheet on the underside of each of these walls and these sheets of ice progressively increase in thickness until they meet each other and are homogeneously joined together forming a solid unbroken cake of ice of uniform texture. The receptacle is usually submerged in a freezing solution and the freezing influence is always greater at the bottom than at the top. The result of this is that the ice freezes more rapidly at the lower portions of the side walls $a$ than at the bottom of the receptacle and hence the effect shown in Fig. 5 is presented, to wit, the progressively increasing sheets of ice forming on the side walls $a$ are thicker at the bottom than at the top and meet each other at the bottom before they meet at the top leaving a tapering water space indicated at X′ in the center. This water space X′ gradually decreases until finally the entire cake is frozen solid from one wall $a$ to the other and extending continuously from the bottom to the very top thereof.

It is well known that ordinarily in ice making processes such as that to which the invention relates, the cake of ice will be formed with a soft snow-like center or core due to the presence of the air in the water and owing to the impossibility of this air escaping by a natural process it has been frequently proposed, with more or less success, to eradicate this defect by circulating air or water through the water in the receptacle. I have found, however, that this can be more effectually done and the best results obtained by injecting air into the receptacle along lines approaching parallelism with the conducting walls $a$ and between the progressively thickening sheets of ice formed at said walls, the inlet orifices being in a vertical line or in the form of one vertical elongated orifice in the nature of a slot so that as the cake solidifies at the bottom continuously across from one wall $a$ to the other, the orifices at the bottom will be closed, but those above will still be unobstructed. In attaining this end I introduce into the non-conducting end walls $c$ and into the partitions $d$, if the the same are unemployed, pipes $e$ having an orifice $f$ opening into the water space. These nozzles are arranged one above the other and are preferably of increasing diameter from the top downward, but this is not essential. The nozzles are so arranged that they will inject currents of air into the water space in the manner indicated by the dotted lines at the right hand end of Fig. 2 and by the bubbles indicated in Fig. 5, that is to say, the air currents are injected in a plane which is midway between the conducting walls $a$ and parallel therewith. This is the ideal condition, although the broad principle which I contemplate may be accomplished more or less imperfectly by variations of this precise arrangement. The principle is that a continuous circulation is maintained in the water space between the two sections of ice which are forming toward each other and as fast as the cake solidifies completely at the bottom and some of the air supplied is there cut off, sufficient of the air supply remains above to agitate the remaining water thus expelling the air and producing a cake of ice which is of perfect texture uniformly throughout the cake. Owing to the manner in which the cake is formed and particularly to the fact that the two sheets of ice do not unite simultaneously on their surface, but unite progressively from the bottom upward, the joint between the two parts thus formed is practically perfect and a homogeneous cake is the result.

After the cake of ice is formed, the receptacle is lifted out of the freezing agent and heated either naturally or artificially to loosen the ice from the sides of the receptacle and thereupon the cakes will readily slide out. To facilitate this the walls $c$ and $d$ are preferably made slightly tapering as shown. These walls, particularly the walls $d$, may be permanently placed in position or may be made removable as desired. In the latter case they would be removed from the receptacle with the ice and subsequently separated from the same.

Figs. 1 and 2 show a receptacle of more than two compartments, but Fig. 6 shows an arrangement in which the receptacle has only two compartments. Here the end walls $c'$ may be non-conducting if desired, but they are preferably of conducting material, the central partition alone being non-conducting and provided with an air circulating means discharging into both compartments. In this form of the invention the ice freezes from the two sides, the same as shown in Fig. 5 as far as the vertical section is concerned, but in addition freezes along the outer walls $c'$ in the manner indicated at $X^2$, Fig. 6, the air circulating from both sides of the central non-conducting partition with the same effect heretofore described.

Having thus described my invention, what I claim as new and desire to secure by Letters Patent in the United States is:—

1. An apparatus for producing artificial ice comprising a receptacle having a non-conducting wall, and conducting walls, opposing each other and adjoining said non-conducting walls, and having a free, unobstructed, open chamber between the said conducting walls, whereby the ice forms in sheets on said conducting walls and progressively increases until the two sheets of the ice are homogeneously united, continuously throughout the whole area of the said sheets, and means extending through the non-conducting wall for injecting a circulating fluid current into said receptacle centrally between the sheets of ice.

2. An apparatus for producing artificial ice comprising a receptacle having a non-conducting wall and conducting walls opposing each other and adjoining said non-conducting walls and having a free, open, unobstructed chamber between the said conducting walls, whereby the ice forms in sheets first along the conducting walls and progressively increases until the two sheets of the ice are homogeneously united continuously throughout the area of the said receptacle, and means for injecting circulating fluid currents into said receptacle at different elevations and substantially central between the two sheets.

3. An apparatus for producing artificial ice comprising a receptacle having a non-conducting wall and conducting walls opposing each other and adjoining said non-conducting walls and having a free, open, unobstructed chamber between the said conducting walls, whereby the ice forms in sheets first along the conducting walls and progressively increases until the two sheets of the ice are homogeneously united continuously throughout the area of the said receptacle, and means extending through said non-conducting wall for injecting circulating fluid currents into said receptacle at different elevations and substantially central between the two sheets.

4. An apparatus for forming artificial ice comprising a receptacle having opposing conducting walls with a clear, open, unobstructed chamber between them, and a non-conducting partition forming two separate and distinct compartments.

5. An apparatus for forming artificial ice comprising a receptacle having opposing conducting walls with a clear, open, unobstructed chamber between them, non-conducting partitions forming separate and distinct compartments and means for conducting fluid through said non-conducting partition and discharging the same from the sides thereof, into the compartments of the said receptacle.

6. A device of the class described comprising a can and a partition transversely mounted in the can, the said partition having a central air passage provided with lateral ducts communicating with the exterior of the partition.

7. A device of the class described comprising a can and a partition transversely mounted in the can, the partition being of low heat conductivity and being provided with a central air passage having lateral ducts communicating with the exterior of the partition.

8. A device of the class described comprising a can and a partition transversely mounted in the can; a pipe longitudinally mounted in the partition; and lateral pipes connecting the interior of the can with the longitudinal pipe.

9. A device of the class described comprising a can and a partition transversely mounted in the can, the partition being of low heat conductivity; a pipe longitudinally mounted in the partition; and lateral pipes connecting the interior of the can with the longitudinal pipe.

In testimony whereof I have signed my name to this specification in the presence of two subscribing witnesses.

PAUL F. STEIN.

Witnesses:
 ISAAC B. OWENS,
 E. S. McLAUGHLIN.